(12) United States Patent
Alcock et al.

(10) Patent No.: US 6,276,843 B1
(45) Date of Patent: Aug. 21, 2001

(54) ADJUSTABLE OPTICAL FIBRE CONNECTOR

(75) Inventors: Ian Peter Alcock, Hemel Hempstead; David James Pointer, Chandlers Ford, both of (GB)

(73) Assignee: Point Source Limited (GB)

( * ) Notice: Subject to any disclaimer, the term of this patent is extended or adjusted under 35 U.S.C. 154(b) by 0 days.

(21) Appl. No.: 09/073,960

(22) Filed: May 7, 1998

(30) Foreign Application Priority Data

May 9, 1997 (GB) .................................................. 9709479

(51) Int. Cl.⁷ ...................................................... G02B 6/42
(52) U.S. Cl. ............................................................... 385/90
(58) Field of Search ................................. 385/90, 33, 34, 385/35; 359/822, 827, 896

(56) References Cited

U.S. PATENT DOCUMENTS

| | | | |
|---|---|---|---|
| 3,655,275 | 4/1972 | Seagreaves | 350/320 |
| 3,922,064 | 11/1975 | Clark et al. | 350/96 C |
| 4,009,931 | 3/1977 | Malsby et al. | 350/96 C |
| 4,146,300 | 3/1979 | Kaiser . | |
| 4,193,664 | 3/1980 | Ellwood | 350/96.21 |
| 4,215,913 | 8/1980 | Robinson et al. . | |
| 4,296,999 | 10/1981 | Mead . | |
| 4,456,334 | 6/1984 | Henry et al. . | |
| 4,649,616 | 3/1987 | Bricker . | |
| 4,696,538 | * 9/1987 | Despouys | 350/96.2 |

(List continued on next page.)

FOREIGN PATENT DOCUMENTS

| | | | | |
|---|---|---|---|---|
| 26 02 662 | 7/1977 | (DE) . | | |
| 0 128 768 | 12/1984 | (EP) | ................................ | G02B/7/26 |
| 0 185 413 A1 | 6/1986 | (EP) | ................................ | G02B/6/38 |
| 0 293 044 A2 | 11/1988 | (EP) | ................................ | G02B/6/38 |
| 0 293 044 A3 | 11/1988 | (EP) | ................................ | G02B/6/38 |
| 0 306 220 | 3/1989 | (EP) . | | |
| 0 457 284 A2 | 11/1991 | (EP) | ................................ | G02B/6/38 |
| 0 457 284 A3 | 11/1991 | (EP) | ................................ | G02B/6/38 |
| 1 535 499 | 12/1978 | (GB) | ................................ | G02B/5/14 |
| 2 311 621 | 10/1997 | (GB) | ................................ | G02B/6/36 |
| WO 90/15350 | 12/1990 | (WO) | ................................ | G02B/6/38 |

OTHER PUBLICATIONS

*Optical Radiation Coupling Into an Optical Fiber*, Research Disclosure No. 38528 of May 1996, cited in the Search and Examination Report on the UK patent application corresponding to USSN 09/073960.

Primary Examiner—Jon Henry
(74) Attorney, Agent, or Firm—Karen Lee Orzechowski; Liniak Berenato Longacre & White LLP (57) ABSTRACT

An optical fiber connector comprising a manipulator 11 in the form a cylindrical tube having a throughbore 12 which receives a carrier 13 in the form a cylindrical tube having a throughbore 14. The carrier 13 receives an optical fiber assembly 15 which is to be coupled to another optical component by means of the connector. The manipulator 11 has two pairs of adjustment screws 18a, 18b and 19a, 19b, which can be used to displace the carrier and optical fiber assembly within the manipulator. The manipulator also includes two adjustable spring plungers 22 for applying a variable resilient biassing force to urge the carrier against the contact points of the adjustment means when it is inserted into the manipulator. The carrier 13 includes plural pads 24, which have flat, planar surfaces 25 and protruding studs 26 mounted therein. The pads are arranged in holes 27 in the carrier body such that their flat surfaces form part of the outer surface of the carrier. These flat surfaces form lands that the adjustment means engage when the carrier is inserted in the manipulator. The carrier also includes a separable collar 28 which can be secured to the optical fiber assembly and which mates with the main body of the carrier in a single orientation with respect to rotation about the longitudinal axis of the carrier.

15 Claims, 4 Drawing Sheets

U.S. PATENT DOCUMENTS

| | | | |
|---|---|---|---|
| 4,753,510 | 6/1988 | Sezerman | 350/96.21 |
| 4,884,861 | 12/1989 | Nodfelt | 350/96.18 |
| 4,889,406 | 12/1989 | Sezerman | 350/96.21 |
| 5,163,114 * | 11/1992 | Hendow | 385/33 |
| 5,181,272 | 1/1993 | Hopper | 385/139 |
| 5,208,888 | 5/1993 | Steinblatt et al. . | |
| 5,247,595 | 9/1993 | Földi | 385/78 |
| 5,400,674 | 3/1995 | Arnone et al. . | |
| 5,422,970 * | 6/1995 | Miller et al. | 385/72 |
| 5,509,093 * | 4/1996 | Miller et al. | 385/27 |
| 5,584,569 * | 12/1996 | Huang | 362/288 |
| 5,638,472 | 6/1997 | Van Delden | 385/33 |
| 5,917,985 * | 6/1999 | Im | 385/140 |

\* cited by examiner

ADJUSTABLE OPTICAL FIBRE CONNECTOR

The present invention relates to connectors for coupling electromagnetic and in particular laser radiation into and out of optical fibres and components therefor. It relates in particular to connectors in which the alignment between the optical fibre and connector can be adjusted to optimise the transmission of radiation into and out of the optical fibre.

In many optical applications, electromagnetic radiation is transmitted along optical fibres and must therefore be coupled into the fibre at one end (for example from a laser source) and coupled out of the fibre at the other end into, for example, another fibre or some other optical component. In order to do this the radiation is typically focused on to the fibre end by one or more lenses, and lenses are similarly provided at the other end of the fibre to focus or collimate the exiting radiation.

One problem with such an arrangement is that both lateral misalignment between the optical axis of the fibre and the optical axis of the lens (or other optical component) and relative tilt between the central axes of the lens and fibre can lead to energy losses as the radiation is coupled into or out of the optical fibre.

In order to help reduce losses due to poor alignment between the fibre and lens (or other optical element), the end of the optical fibre and the lens are typically both mounted in a cylindrical tube in a predetermined fixed alignment with each other. This assembly is usually known as a lens barrel or a lens tube. The lens barrel holds the lens and fibre in a fixed, aligned relationship, thereby helping to avoid losses due to misalignment between the lens and fibre in use.

However, even with such an arrangement, losses can still occur due to misalignment between the fixed fibre and lens in the lens barrel and the laser source or other optical component to which the optical fibre is being optically coupled.

For example, any lateral displacement of the fibre and lens with respect to the incident radiation will cause the radiation impinging on the fibre end to be incident at an angle to the optical axis of the fibre. This could mean that some of the incident radiation falls outside the acceptance angle of the fibre, thereby leading to losses.

Any tilt of the central axis of the radiation source with respect to the central axis of the fibre and lens arrangement will cause the focused radiation to be displaced across the end face of the fibre. This may result in some radiation missing the fibre end face.

These situations can be common when coupling radiation from a laser or other sources into an optical fibre, and in both cases, the coupling efficiency will be degraded.

The change in coupling efficiency is proportional to $\exp-(\theta/\theta_{div})^2$ and $\exp-(d/\rho)^2$ where $\theta$ is the angle between the radiation incident on the fibre face and the optical axis of the fibre, $\theta_{div}$ is half the acceptance angle of the fibre, d is the displacement of the radiation incident on the fibre face and $\rho$ is the mode size of the fibre. Typical values for $\rho$ and $\theta_{div}$ are 3 $\mu$m and 100 milliradians. The typical precision required for adjustment is therefore to within 50 $\mu$m and 10 microradians.

A similar situation can arise with the radiation emerging from an optical fibre where alignment with other optical components is required, or radiation needs to be coupled from one optical fibre to another (either with or without additional components in between).

In order to reduce these alignment losses, it is desirable to be able to adjust the alignment of the lens barrel and the laser source or other optical component to which the optical fibre is being coupled in use. In order to achieve this, the lens barrel is typically coupled to the laser source or optical component by means of a connector which allows the position of the lens barrel (and thus the fibre and lens) with respect to the laser source or optical component to be adjusted. Such a connector would typically provide adjustment of both tilt and lateral displacement, although the adjustable parameters may vary depending upon the application concerned.

Figure 1:
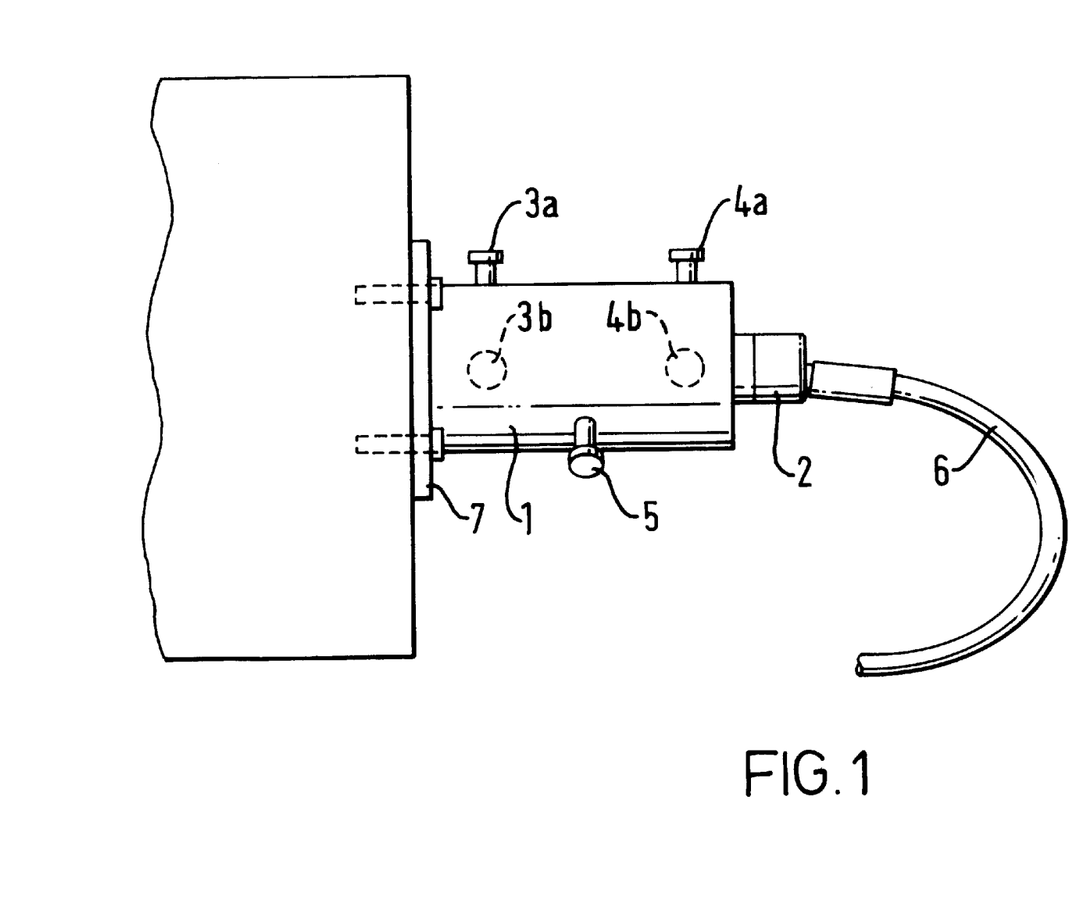
FIG. 1 shows a prior art optical fibre connector.

A known prior art connector is shown in FIG. 1. It comprises a cylindrical tube 1 which can receive a lens barrel 2 in use. The tube has two pairs of adjustments screws 3a, 3b and 4a, 4b, which extend through the tube and can engage the outer surface of the lens barrel once it has been inserted for adjusting the position of the lens barrel within the tube. An adjustable spring 5 is provided in an opposed relationship to the screws 3a, 3b, 4a, 4b to resiliently bias the lens barrel into engagement with the tips of the adjustment screws. The connector can be fixed to the optical component, laser source, etc., to which the optical fibre 6 is to be coupled by means of a flange 7.

In use, the lens barrel is inserted into the tube 1, and the spring 5 adjusted to resiliently bias it against the adjustment screws 3a, 3b, 4a, 4b. The screws 3a, 4a or 3b, 4b can then be moved together to move the lens barrel laterally (i.e. in a plane perpendicular to the axis of the lens barrel), or the screws 3a, 3b or 4a, 4b can be moved together to tilt the lens barrel in order to align the lens and optical fibre with the laser source, optical component, etc.

However, the Applicants have recognised a number of problems with this prior art connector.

One such problem is that because the adjustment screws engage the curved surface of the lens barrel, then adjustment of one screw to cause lateral displacement in one direction also causes lateral displacement in the direction of adjustment of the other adjustment screw as that screw moves around the curved surface of the lens barrel. This crosstalk between adjustment movements can make precise adjustment of the position of the lens barrel more difficult.

Another problem that the applicant's have recognised is that the lens barrel can be inserted in the connector at any orientation with respect to rotation about its longitudinal axis.

According to a first aspect of the present invention, there is provided an adjustable connector system for coupling an optical fibre assembly to an optical component, comprising:
a carrier means having a body having a throughbore adapted to receive the optical fibre assembly in use;
and a manipulator means having a body having a throughbore adapted to receive removably the carrier means and optical fibre assembly in use, the manipulator means further including one or more adjustment means which are engageable against the outer surface of the carrier means when it is inserted in the manipulator means throughbore and are adjustable by a user to then move the carrier means relative to the manipulator means in a direction perpendicular to the longitudinal axis of the manipulator means throughbore, the adjustment means being arranged such that they can be used to adjust the tilt of the longitudinal axis of the carrier means relative to the longitudinal axis of the manipulator means throughbore;
the system further being arranged such that when the optical fibre assembly is inserted in the carrier means movement of said adjustment means to effect movement of said carrier means relative to the manipulator means causes corresponding movement of the optical fibre assembly relative to the manipulator means; and wherein the carrier means includes one or more lands on its outer surface arranged such that the carrier means can be inserted into the manipulator means in such a way that the adjustment means will in use engage only the lands, the lands further being arranged such that the carrier means can only be so inserted into the manipulator means in one or more discrete orientations with respect to rotation about the longitudinal axis of the manipulator means throughbore.

In this aspect of the present invention, the rotational orientation of the carrier means or carrier with respect to the manipulator means in use can be fixed and reproduced reliably by inserting the carrier means such that the adjustment means or adjustors for laterally displacing the carrier means (and thus the optical fibre assembly) engage only the lands on the outer surface of the carrier means, This is important when, as in this aspect of the present invention, the tilt of the carrier means in the manipulator means or manipulator can be adjusted and the carrier means then removed. The tilt adjustment, particularly where it is to cure misalignment between the axis of the optical fibre and the longitudinal axis of a cylinder e.g. the carrier means holding it, can be rotationally sensitive and thus by being able to return the carrier to the same rotational orientation, the need to adjust or at least check the tilt each time the carrier is reinserted is removed. Preferably the arrangement is such that the carrier means can only be inserted in a single rotational orientation.

According to a second aspect of the present invention, there is provided an adjustable connector system for coupling an optical fibre assembly to an optical component, comprising:

a carrier means having a body having a throughbore adapted to receive the optical fibre assembly in use;

and a manipulator means having a body having a throughbore adapted to receive the carrier means and optical fibre assembly in use, the manipulator means further including one or more adjustment means which are engageable against the outer surface of the carrier means when it is inserted in the manipulator means throughbore and are adjustable by a user to then move the carrier means relative to the manipulator means in a direction perpendicular to the longitudinal axis of the manipulator means throughbore;

the system further being arranged such that when the optical fibre assembly is inserted in the carrier means movement of said adjustment means to effect movement of said carrier means relative to the manipulator means causes corresponding movement of the optical fibre assembly relative to the manipulator means; and wherein the carrier means includes one or more substantially planar lands on its outer surface arranged such that the carrier means can be inserted into the manipulator means in such a way that the adjustment means in use will engage only the lands.

In this aspect of the connector system of the present invention, the adjustment means for laterally displacing the carrier means (and thus the optical fibre assembly) can be arranged to all only engage planar lands on the outer surface of the carrier means. This use of planar, flat surfaces can be used to avoid the crosstalk caused by the curved surfaces on which the adjustment means act in the prior art connector discussed above.

A further advantage to the use of planar engagement surfaces for the adjustment means is that the carrier means can then be arranged to be correctly insertable in the manipulator means in a single or plural discrete rotational orientations about the longitudinal axis of the carrier means throughbore only.

The present invention therefore provides an improved adjustable connector for coupling an optical fibre to an optical component such as a laser source, lens array, etc, without the need for expensive, high precision components.

The plane of the lands preferably includes the line extending in a direction perpendicular to the longitudinal axis of the manipulator means throughbore and lying in a plane perpendicular to the direction of motion of the respective adjustment means. In a particularly preferred arrangement the lands lie in the plane perpendicular to the direction of motion of the respective adjustment means, and, more preferably, also in a plane parallel to the longitudinal axis of the carrier means throughbore.

Each adjustment means can engage a single, or more than one land. For example, each adjustment means could engage a pair of lands formed into a v-crosssection groove. A single land could also be engaged by more than one adjustment means. Preferably each adjustment means engages a different land to the other adjustment means.

In use of the adjustable connector of the present invention, the optical fibre assembly is firstly inserted into the carrier means and then the carrier means is inserted into the manipulator means in such a way that the planar lands on the carrier means are aligned with the engaging surfaces of the adjustment means. The adjustment means can then be used to adjust the position of the carrier means within the manipulator means to align the optical fibre assembly and optical component.

The optical fibre assembly can comprise an optical fibre alone or could include other optical elements such as a lens. In either case the optical fibre and/or optical element(s) could be fitted directly in the carrier means or could be held in another component (such as a lens barrel) which is then received by the carrier means. Preferably the assembly is a lens barrel, comprising a cylindrical tube holding a lens and optical fibre is a fixed prealigned relationship.

It is believed that the use of a carrier adapted to receive an optical fibre assembly and having effectively planar lands on its outer surface is in itself advantageous, since such a carrier could then be used with already existing adjustable connectors.

Thus according to a third aspect of the present invention, there is provided a carrier for an optical fibre assembly, comprising a body having a throughbore adapted to receive the optical fibre assembly, the body further having one or more substantially planar lands on its outer surface surrounding the throughbore.

According to a fourth aspect of the present invention, there is provided an optical fibre having at least one of its ends inserted into a throughbore in an elongate tubular body, the body having one or more substantially planar lands on its outer longitudinal surface.

The location and arrangement of the lands on the carrier means should be such that they can be aligned with the adjustment means of the manipulator means in use in such a way that the adjustment means only engage the lands, and will thus depend upon the actual arrangement of the adjustment means on the manipulator means.

For example, a carrier means to be used in conjunction with the prior art connector referred to above could have at least a pair of substantially mutually orthogonal substantially planar, flat lands on its outer surface arranged at the same place along the length of the carrier means and extending for the same distance along the length of the throughbore in the carrier means. Alternatively, two pairs of substantially mutually orthogonal, preferably spaced apart, flat lands could be provided, the flat lands of each pair being at the same longitudinal position along the length of the carrier means, and the two pairs being spaced apart from one another along the length of the throughbore in the carrier means.

The lands themselves can be formed directly in the outer surface of the carrier means (for example by appropriate machining of the carrier means surface), or be in the form of separate components fixed on the surface thereof. In a particularly preferred arrangement, the lands comprise flat pads inserted into the body of the carrier means.

The lands are preferably sufficiently hard to resist deformation in use. They can, for example, be of hardened steel or ceramic.

The surface of the carrier means away from the lands need not be flat. The carrier means could, for example, comprise a cylindrical tube having flat lands on its outer surface. In such an arrangement, the planes of the lands are most preferably perpendicular to respective radii of the cylinder. Preferably the carrier means is in the form of a hollow sleeve that can float within the manipulator means throughbore.

The lands can be arranged to fix the point about which the carrier means pivots when its tilt relative to the manipulator means is adjusted. For example, in the case where the optical fibre assembly includes both an optical fibre and another optical element such as a lens (such as in a lens barrel), the lands on the carrier means can be positioned at the same longitudinal position as the optical element to allow the carrier means (and thus the optical fibre assembly) to be pivoted about the optical element when adjusting its tilt in use.

The adjustment means could comprise screws which can be arranged to penetrate the manipulator means wall into the throughbore such that their ends then directly engage the surface of the carrier means as in the prior art connector described above, or could include other devices which would allow manipulation of the carrier means, such as piezo electric devices.

The number and exact arrangement of the adjustment means will depend upon the parameters desired to be adjustable. Preferably at least two adjustment means are provided. This makes tilt adjustment easier. The adjustment means could, for example, be arranged as in the prior art connector shown in FIG. 1.

For example, at least a pair of substantially mutually orthogonal and/or pair of longitudinally spaced, adjustment means could be provided. Alternatively, two pairs of substantially mutually orthogonal, preferably spaced apart, adjustment means could be provided, the adjustment means of each pair being at the same longitudinal position along the length of the manipulator means, and the two pairs being spaced apart from one another along the length of the throughbore in the manipulator means.

Where the adjustment means can displace the carrier means in two directions perpendicular to the longitudinal axis of the manipulator means (for example if lateral and/or tilt adjustment in two directions is desired), then the displacement directions are preferably arranged to be orthogonal to each other and, more preferably, to lie in a plane perpendicular to the longitudinal axis of the manipulator means throughbore. This ensures that there is no crosstalk between the displacement directions when they are adjusted. This orientation of displacement directions and the use of appropriately arranged flat, planar lands is particularly advantageous since displacement in each lateral direction can then be carried out independently of any displacement in the other direction.

The adjustment means preferably engage the lands at discrete points, rather than over extended portions of their surfaces. This helps the accuracy of the adjustment and engagement. The adjustment means can have, for example, spherical contact surfaces.

In a particularly preferred embodiment the manipulator means further includes a resilient biassing device or means for resiliently biassing the carrier means against the adjustment means when it is inserted in the manipulator means. This reduces the number of adjustment means required to retain the carrier means in the manipulator means whilst still providing adjustment in the desired directions, and thereby also makes the adjustment operation itself easier. The biassing means can act on the carrier means directly or it could do so indirectly, for example, by acting on the optical fibre assembly and thereby on the carrier means. The resilient bias can be provided by, for example, a spring or springs, or by suitably arranged magnets.

The force applied by the biassing means on each adjustment means should preferably be equal. In the case where there are plural adjustment means spaced apart along the longitudinal axis of the manipulator means, then there are preferably separate resilient biassing means at each longitudinal position of an adjustment means. This can help to avoid bending of the carrier means and/or optical fibre assembly. This can be important when dealing with the small movements associated with the alignment of optical fibres.

Thus according to a fifth aspect of the present invention, there is provided a manipulator for adjusting the position of an optical fibre assembly comprising a body having a throughbore adapted to receive the optical fibre assembly in use, and at least two adjustment means moveable by a user so as to move the optical fibre assembly relative to the manipulator means in a direction perpendicular to the longitudinal axis of the manipulator means throughbore; wherein the adjustment means are spaced apart along the longitudinal axis of the throughbore, there being further positioned at the same longitudinal positions as each adjustment means, means for resiliently biasing the optical fibre assembly against the respective adjustment means.

The means for providing the biassing force is preferably arranged such that the biassing force can be selectively removed and reapplied when desired. This allows the carrier means and/or optical fibre assembly to be removed from the body without any need to move the positions of the adjustment means. In this way, the adjustment means can be left in their adjusted positions while the carrier means and/or optical fibre assembly is removed and reinserted as often as desired.

The optical fibre assembly can be secured to the carrier means such that it cannot be removed from the manipulator means independently of the carrier means. in such an arrangement, the carrier means itself could include means for securing the fibre thereto once it has been inserted therein. The optical fibre assembly could be secured to the carrier means by, for example, adhering it thereto, or by gripping it with screws mounted on the carrier means. An example of the carrier means in such an arrangement would be the lens barrel discussed above, but with flat regions appropriately located on its outer surface.

However, in a particularly preferred embodiment, the optical fibre assembly is releasably retained in the carrier means when it is inserted therein, such that it can be repeatedly removed from and reinserted in the carrier means, without the need to remove the carrier means from the manipulator means. The carrier means could, for example, include means such a spring, for releasably resiliently retaining the optical fibre assembly when it is inserted therein.

Alternatively, the manipulator means could include means for releasably retaining the optical fibre assembly in the carrier means (and thus in the manipulator means) when the carrier means and optical fibre assembly are inserted in the manipulator means. The manipulator means could, for example, include a screw which can penetrate through the wall of the carrier means to act on the optical fibre assembly to hold it against the carrier means such that it is retained.

In a particularly preferred such arrangement where the manipulator means includes means for resiliently biasing the carrier means against the adjustment means, the biasing means is preferably also arranged to act on the optical fibre assembly to resiliently bias it against and thereby retain it in the carrier means. For example, the resilient biasing means could act on the optical fibre assembly to hold it against the carrier means and the carrier means thereby against the adjustment means.

In these arrangements where the manipulator means includes means for releasably retaining the optical fibre assembly in the carrier means, then the carrier means can include one or more through holes to allow the retaining means to penetrate into the throughbore of the carrier means and thereby engage the optical fibre assembly when it is inserted therein. These through holes will usually be generally opposed to the lands on the surface of the carrier means. This facilitates, for example, the use of the resiliently biasing means to retain the optical fibre assembly in the carrier means in use.

According to a sixth aspect of the present invention, there is provided a carrier for receiving an optical fibre assembly, comprising:

a body having a throughbore for receiving the optical fibre assembly;

one or more substantially planar lands on its outer surface surrounding the throughbore; and one or more holes extending from the outer surface surrounding the throughbore into the throughbore arranged in generally opposing relationship to the lands.

Where the optical fibre assembly is removable from the carrier means without the need to remove the carrier means as well from the manipulator means, then the carrier means is preferably retained in its position in the manipulator means once the optical fibre assembly has been removed. This could be achieved by, for example, suitable springs or magnets being located on the carrier means and/or manipulator means. This avoids the problem of the carrier means falling out of the manipulator means, and can also help to ensure that the lands on the surface of the carrier means and the adjustment means of the manipulator means remain aligned, once the optical fibre assembly has been removed.

The provision of a carrier means that can remain in the manipulator means while the optical fibre assembly is removed therefrom has a number of advantages. Firstly, the carrier means can remain in the manipulator means with its lands aligned with the adjustment means of the manipulator means, such that removal and subsequent reinsertion of the optical fibre assembly does not then require realignment of the lands with the adjustment means.

Furthermore, a single such carrier means can then be used with multiple optical fibre assemblies without the need for the optical fibre assemblies to be specially constructed to have their own lands. Thus such a construction can, for example, be used with existing optical fibre assemblies such as the lens barrel described above. This arrangement also avoids, for example, the need to produce and assemble such lens barrels having lands on their outer surfaces.

The carrier means and optical fibre assembly preferably engage in use only at discrete contact points, rather than across a substantial area of their facing surfaces. This arrangement means the optical fibre assembly only ever contacts the carrier means in use at the same, well defined reference points on the carrier means. The carrier means and optical fibre assembly thus cooperate in use according to kinematic principles. This enables accurate adjustment of the optical fibre assembly, and ensures that there is good reproducibility of alignment and engagement when refitting the optical fibre assembly in the carrier means, thus reducing the need for subsequent readjustment when the optical fibre assembly is removed and refitted following its initial alignment.

To achieve this point contact, the carrier means can include a number of studs arranged to stand proud of the surface of the throughbore such that these studs alone will engage the optical fibre assembly when it is inserted in the carrier means.

It is particularly preferred if the lands which the adjustment means engage and the contact points in the throughbore of the carrier means lie along the same line pointing towards the central longitudinal axis of the carrier means throughbore. This helps to avoid bending of the carrier means due to misalignment between the lands on its outer surface and the contact points on its inner surface. In the preferred arrangements where the lands are in the form of pads inserted into the body of the carrier means, this can be achieved by providing the pads with suitable studs on the sides opposed to their flat surfaces.

Another advantage of a carrier means having planar lands with which the adjustment means of the manipulator means engage is that by appropriate location and orientation of these lands, it can be ensured that the lands will only align properly with the adjustment means of the manipulator in one particular orientation with respect to the rotation about the longitudinal axis of the throughbore of the carrier means. In other words, the carrier means and manipulator means can be arranged such that the carrier means always has the same orientation with respect to rotation about its longitudinal axis when properly inserted in the manipulator means. If the optical fibre assembly is then fixed against rotation about its longitudinal axis in the carrier means, the rotational orientation of the optical fibre assembly in the manipulator means (and thus with respect to the optical component to which it is being coupled) can then be fixed.

Such a fixed rotational alignment can be necessary and desired in some optical systems. An example of this would be where it is important to maintain polarisation of laser radiation, and polarization maintaining optical fibres are being used. Another example is when plural fibres running side-by-side in an optical fibre assembly need to be aligned. Often there will only be one rotational orientation where all the fibres are correctly aligned with the optical component(s) to which they are to be coupled. By appropriate fixing of the optical fibre assembly to the carrier means and orientation of the lands of the carrier means, the correct rotational alignment can be achieved and ensured.

It would, for example, be possible to secure the optical fibre assembly in the carrier means in a fixed rotational orientation by appropriately aligning it within the carrier (and thus to the lands thereon) and then securing it thereto. However, when it is desired that the optical fibre assembly can be removed from the manipulator means independently of the carrier means, this arrangement is not necessarily desirable, since each time the optical fibre assembly was removed from the carrier means, it would be necessary to realign it upon reinsertion.

In a particularly preferred embodiment therefore, where it is desired to be able to remove the optical fibre assembly from the carrier means without the need to remove the carrier means from the manipulator means, the carrier means further comprises a separable collar which mates in a fixed orientation with respect to rotation about the longitudinal axis of the carrier means throughbore with the carrier means body, which collar is securable to the optical fibre assembly.

In this arrangement the optical fibre assembly can be inserted in the carrier means and can then be rotationally aligned as desired while the carrier means is inserted in the manipulator means, and then, while maintaining the rotational alignment between the collar and optical fibre assembly, the collar can be secured to the optical fibre assembly. The optical fibre assembly and the collar secured to it can then be subsequently removed and reinserted into the carrier means while the carrier means body remains in the manipulator means, with the assurance that the optical fibre assembly will be in the correct rotational orientation when the collar is mated with the carrier means body in the manipulator means. This arrangement thus ensures that the optical fibre assembly can be removed and reinserted in the carrier means without loss of rotational alignment. Thus the optical fibre assembly can be removed from the carrier means and the manipulator means and reinserted therein without the loss of polarisation alignment or the need for subsequent rotational realignment. It is also advantageous because it permits the rotational alignment to be adjusted and fixed after (and without loss of) tilt (and less importantly lateral) alignment adjustments. This is important because rotational alignments would normally be done last as light through the fibre is often required for this, but if such rotation changed the tilt, light transmission could be lost.

The collar can be secured to the optical fibre assembly by any suitable means, such as grub screws. It can be arranged to mate with the carrier means body in a predetermined rotational alignment by any suitable means, such as the carrier body or collar including a pin which engages a slot or hole in the collar or carrier body, respectively.

The collar can also be used to fix the position of the optical fibre assembly along the longitudinal axis of the carrier means body, by securing it to the optical fibre assembly at an appropriate point along the length thereof. This can be used to, for example, ensure that when the optical fibre assembly with the collar secured to it is inserted into the carrier means body such that the collar and carrier means body mate, the lands of the carrier means are positioned about the point along the optical fibre assembly (such as the lens in the lens barrel discussed above) that it is desired to pivot the assembly about during adjustment of the tilt thereof.

The position of the carrier means on the longitudinal axis of the manipulator means throughbore can also be fixed, if desired. This can be achieved in a number of ways. For example, where the resilient biassing means acts through a hole in the carrier means wall, the need to align the hole and the resilient biassing means could also be used to roughly fix the longitudinal position of the carrier means. The carrier means could alternatively or also include a notch which is engaged by a longitudinal positioning screw of the manipulating means.

Alternatively or additionally, and if more precision is required, the lands on the outer surface of the carrier means body can be arranged to form v-crosssection grooves extending perpendicular to the longitudinal axis of the carrier means throughbore, such that the adjustment means can be arranged to engage the grooves and thereby ensure that the carrier means returns to and remains fixed in the same position along the length of the manipulator means in use.

It is believed that the use of a carrier means comprising a collar and main body which can be used to ensure reproducibility of the rotational orientation of an optical fibre assembly with respect of the carrier means body even when the assembly is removed and reinserted therein may be of benefit in applications other than in circumstances where the carrier means body has planar lands on its outer surface.

Thus, according to a seventh aspect of the present invention, there is provided a carrier for an optical fibre assembly, comprising:

a body having throughbore for removably receiving the optical fibre assembly, and a collar which mates with the body in a fixed orientation with respect to rotation about the longitudinal axis of the throughbore, the collar being adapted to be securable to the optical fibre assembly such that while it is so secured it remains in a fixed orientation with respect to rotation about the longitudinal axis of the optical fibre assembly.

It is believed that the use of a connector with a carrier for an optical fibre assembly in which the optical fibre assembly can be removed from the connector independently of the carrier may be advantageous generally, in that the same carrier and connector assembly can then be used for different optical fibre assemblies, and even in cases in connectors where adjustment of the position of the optical fibre assembly within the connector is not desired or not possible.

Thus, according to an eighth aspect of the present invention, there is provided a connector system for connecting an optical fibre assembly to an optical component, comprising:

a carrier means having a body having a throughbore for receiving the optical fibre assembly;

a connector mount comprising a body having a throughbore for receiving the carrier means and optical fibre assembly; and means for retaining the optical fibre assembly, carrier means and connector mount in a fixed relationship to each other when the optical fibre assembly and carrier means are inserted in the connector mount in such a manner that the optical fibre assembly is removable from the connector mount independently of the carrier means once it has been inserted therein.

The optical fibre assembly, carrier means and connector mount could be held in a fixed relationship to each other with suitably arranged resilient biassing means. The biassing means could, for example, resiliently bias the optical fibre assembly against the carrier means and thus the carrier means and optical fibre assembly against the connector mount once they are inserted in the connector mount.

Although the invention has been described with specific particular reference to connecting and coupling optical fibre assemblies, it should be noted that it would be applicable to other applications where fine adjustment of the position of objects to be held in a body is required, and not just in the optical field.

Thus according to a ninth aspect of the present invention, there is provided an adjustable holder system for holding an object inserted therein and in which the position of the object in the holder can be adjusted by a user, comprising:

a carrier means having a body having an opening adapted to receive the object in use;

and a manipulator means having a body having an opening adapted to receive the carrier means and object in use, the manipulator means further including one or more adjustment means which are engageable against the outer surface of the carrier means when it is inserted in the manipulator means opening and are adjustable by a user to then move the carrier means relative to the manipulator means;

the system further being arranged such that when the object is inserted in the carrier means movement of said adjustment means to effect movement of said carrier means relative to the manipulator means causes corresponding movement of the object relative to the manipulator means; and wherein the carrier means includes one or more substantially planar lands on its outer surface arranged such that the carrier means can be inserted into the manipulator means in such a way that the adjustment means in use will engage only the lands.

A number of preferred embodiments of the present invention will now be described by way of example only, and with reference to the accompanying drawings, in which.

Figure 2:
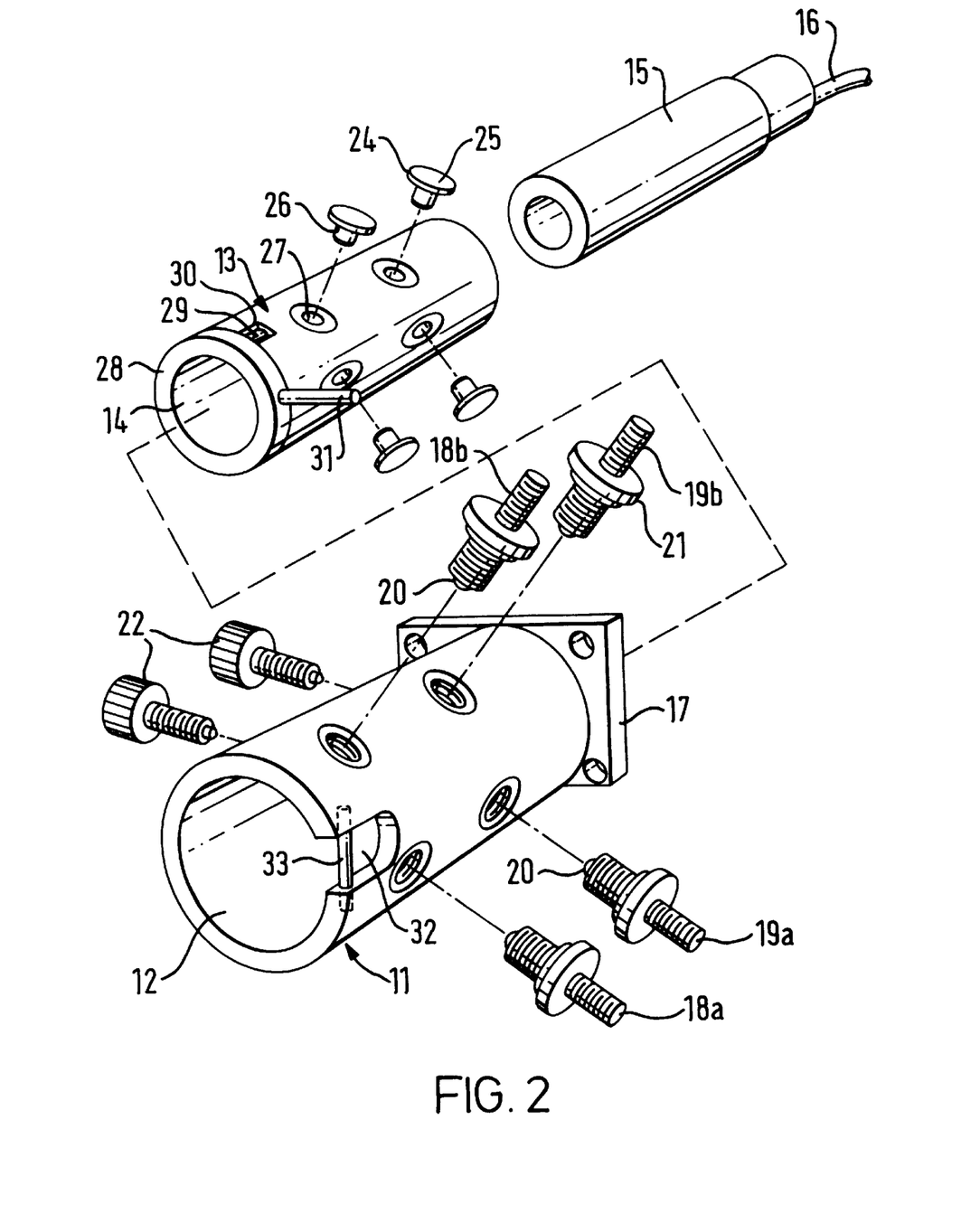
FIG. 2 shows a schematic exploded view of an optical fibre connector in accordance with the present invention.
Figure 3:
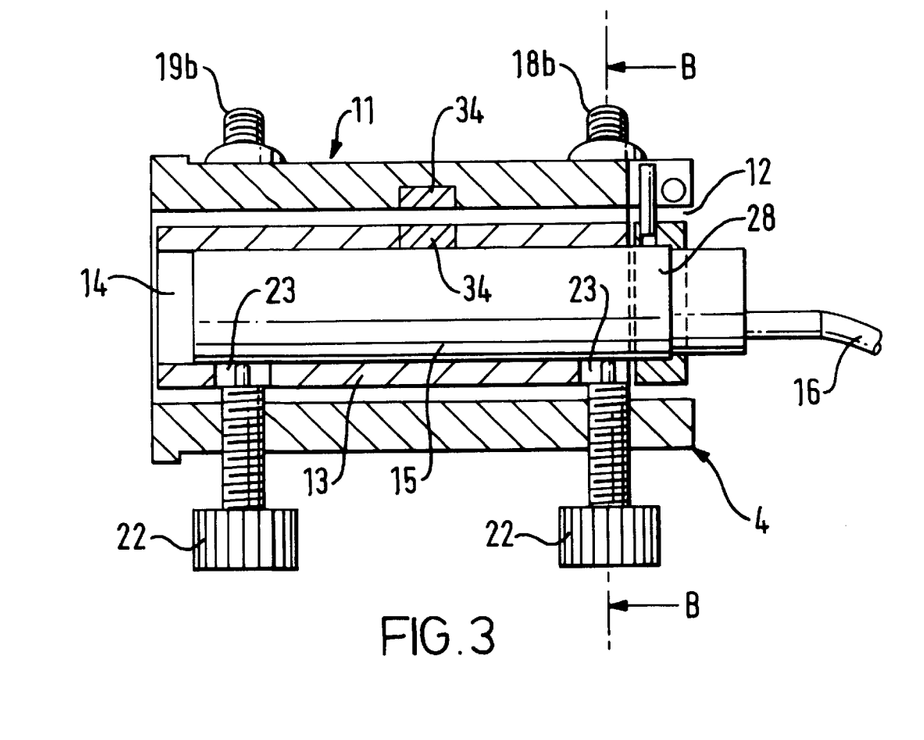
FIG. 3 shows the side cross-sectional view taken along the line A—A in FIG. 4 of the optical fibre connector of FIG. 2 when assembled and mounting an optical fibre assembly.

The optical fibre connector of a first embodiment of the present invention shown in FIG. 2 comprises a manipulator 11 in the form a cylindrical tube having a throughbore 12 which removably receives a sleeve-like carrier 13 again in the form a cylindrical tube having a throughbore 14. The carrier 13 receives removably the optical fibre assembly 15 which is to be coupled to another optical component by means of the connector.

While the manipulator, carrier and optical fibre assembly are shown as being in the form of cylindrical tubes, it should be appreciated that they can have other geometries, if desired.

The optical fibre assembly 15 is shown in this embodiment as being a lens barrel which carries an optical fibre 16. However, the optical fibre assembly is not restricted to such arrangements. It could, for example, comprise a cylinder mounting a different optical element and an optical fibre, a cylinder mounting an optical fibre alone, or simply the optical fibre on its own.

The manipulator 11 includes a flange 17 by which it can be attached to the optical component such as a laser source to which the optical fibre assembly 15 is to be coupled. The flange can alternatively be used to attach the manipulator to an optical bench.

The manipulator 11 also includes two pairs of adjustors in the form of adjustment screws 18a, 18b and 19a, 19b, with the screws of each pair being arranged at the same position along the longitudinal axis of the manipulator body, but acting in orthogonal directions towards and away from the longitudinal axis of the manipulator. In this way, appropriate rotation of the screws can be used to displace the carrier and optical fibre assembly when inserted within the manipulator relative to the longitudinal axis of the manipulator.

The contact tips 20 of the screws must allow the contact point with the carrier to be well defined and the carrier 13 to pivot about it. The screws therefore preferably have spherical ends. The screw tips 20 should also ideally be sufficiently hard such that deformation of them in use is reduced or eliminated. They could, for example, comprise hardened steel or ceramic balls.

The adjustment screws 18, 19 could, for example, comprise fine pitch screws which operate radially, or differential threaded screws, or tapered pins. Locking rings 21 can also be provided to prevent accidental movement of the adjustment screws in use.

The sensitivity of the lateral adjustment can be altered by varying the screw pitch, and the tilt sensitivity can be varied by changing the lateral sensitivity or separation of the adjustment points, Or a combination of the two.

Other forms of adjustment means such as, for example, piezo devices are, of course, possible.

In this embodiment, the adjustment means provide the possibility of lateral adjustment of the optical fibre assembly relative to the longitudinal axis of the manipulator, and adjustment of the tilt of the longitudinal axis of the optical fibre assembly relative to the longitudinal axis of the manipulator. However, the exact number and arrangement of the adjustment means will depend upon the number of degrees freedom needed to be adjustable or constrained, and thus there could be more or less or differently arranged adjustment means to those shown.

It is also possible to provide means such as a threaded sleeve to allow adjustment along the longitudinal axis of the connector.

The manipulator also includes a pair of resilient biassing devices in the form of two adjustable spring plungers 22 mounted at the same position along the longitudinal axis of the manipulator as the adjustment screws 18, 19, but at generally opposed locations around the circumference thereof, for applying a variable resilient biassing force to urge the carrier against the contact points of the adjustment means when it is inserted into the manipulator. In this embodiment the spring plungers 22 in fact penetrate the carrier 13 via holes 23 and thus actually act on the carrier via the optical fibre assembly 15, This arrangement can be seen in FIG. 4.

The spring plungers 22 can, for example, comprise springs mounted on screws which can then be screwed towards or away from the longitudinal axis of the manipulator to provide the biassing force as desired.

It should be noted that in this arrangement the spring bias points are positioned in line with the adjustment means, such that there is a reduced possibility of bending the optical fibre assembly in use.

The resilient biassing means should be preferably arranged in use such that the biassing force at each of the contact points is identical, as this helps to achieve reliable alignment and reproducibility.

It should also be noted that the geometry of adjustment means and the biassing means in this embodiment means the optical fibre assembly cannot be rotated about its longitudinal axis when the bias force is applied, since any rotation will create unequal forces at each contact point and the system will not be in equilibrium, such that the carrier will then be rotated by the bias force until the load is the same for all contact points, i.e. equilibrium is restored.

Figure 4:
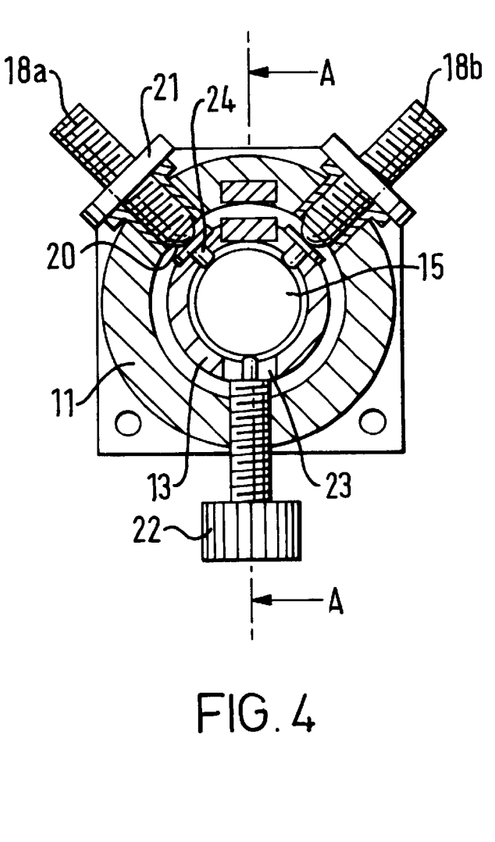
FIG. 4 shows a cross-sectional view along the line B—B are shown in FIG. 3.

The carrier 13 includes plural pads 24, which have flat, planar surfaces 25 and protruding studs 26 mounted therein. The pads are arranged in holes 27 in the carrier body such that their flat surfaces effectively form part of the outer surface of the carrier. These flat surfaces then form the lands that the adjustment means engage, as can be seen from FIG.

4. They should therefore all lie appropriately co-planar (i.e. in the present embodiment each longitudinally spaced pair should lie in parallel planes and most preferably in the same plane). The studs 26 penetrate into the throughbore of the carrier such that they form contact points against which the optical fibre assembly engages. This ensures that the optical fibre assembly engages the carrier at discrete points, rather than across a significant area of their facing surfaces.

The flat surfaces and studs are preferably sufficiently hard such that they will not deform in use.

The pads are arranged in the carrier such that carrier and manipulator can be arranged such that the adjustment means of the manipulator engage only the flat planar surfaces when the carrier is inserted in the manipulator.

The carrier also includes a separable collar 28 which mates with the main body of the carrier in a single orientation with respect to rotation about the longitudinal axis of the carrier. To achieve this the collar 28 has a pin 29 which engages in a corresponding slot 30 on the carrier body. The collar further includes a number of grub screws to enable it to be secured to the optical fibre assembly. The collar allows the rotational orientation of the optical fibre assembly with respect to the carrier and thereby the manipulator to be fixed.

The securement position of the collar on the optical fibre assembly can also be chosen to be at an appropriate point along the length thereof to ensure that the flat lands on the carrier lie about the point at which it is desired to pivot the optical fibre assembly, such as the lens contained in a lens barrel.

The collar also includes a pin 31 which can engage a slot 32 on the manipulator and be secured therein by a further pin 33 to constrain the carrier within the manipulator.

The manipulator and carrier also include magnets 34 which can retain the carrier within the manipulator even when the optical fibre assembly has been removed therefrom. The magnets are appropriately arranged such that they retain the carrier in a position where the flat lands 25 on its outer surface are aligned with the contact tips 20 of the adjustment screws 18, 19.

The alignment procedure for the connector of the present invention of this embodiment is as follows.

The optical fibre assembly and carrier are inserted into the manipulator such that the flat lands 25 on the surface of the carrier align with the adjustment screws 18, 19 of the manipulator. The spring plungers 22 are then screwed in to act on the optical fibre assembly and thereby to resiliently bias the optical fibre assembly and carrier against the adjustment screws.

The tilt of the optical fibre assembly in the manipulator would then typically be adjusted first, although this is not mandatory. The tilt is adjusted by moving the adjustment screws of one or other pair of screws 18, 18b or 19a, 19b while keeping the other pair of adjustment screws stationary. In this way the optical fibre assembly is pivoted by the moving screws about the point held stationary by the stationary pair of screws. Each adjustment screw of the moving pair would usually be moved individually to tilt the optical fibre assembly in each plane separately. Thus, for example, the screw lea could be moved while keeping the remaining screws stationary to tilt the optical fibre assembly in one plane about the screws 19a, 19b, and then the screw 18b moved while keeping the remaining screws stationary to tilt the optical fibre assembly in the orthogonal plane about the screws 19a, 19b.

Once the tilt alignment has been adjusted, the lateral alignment can then be set by displacing the optical fibre assembly laterally in the plane perpendicular to the longitudinal axis of the manipulator by moving the adjustment screws 18a, 19a and/or 18b, 19b together as pairs.

The tilt and lateral adjustments can be repeated as desired until the desired tilt and lateral alignment has been achieved.

Once the tilt and lateral alignment have been optimised, the optical fibre assembly can be rotated about its longitudinal axis until the correct rotational orientation, such as when the polarisation axes are aligned, is achieved. Once this orientation has been achieved the collar can be secured to the optical fibre assembly, thereby preventing further rotation of the optical fibre assembly relative to the carrier and thus the manipulator when the collar is properly mated with the carrier body.

This arrangement ensures that the optical fibre assembly (together with the collar secured to it) can be removed and replaced without the need for realignment, since the same points will be in contact and the alignment preserved.

Figure 5:
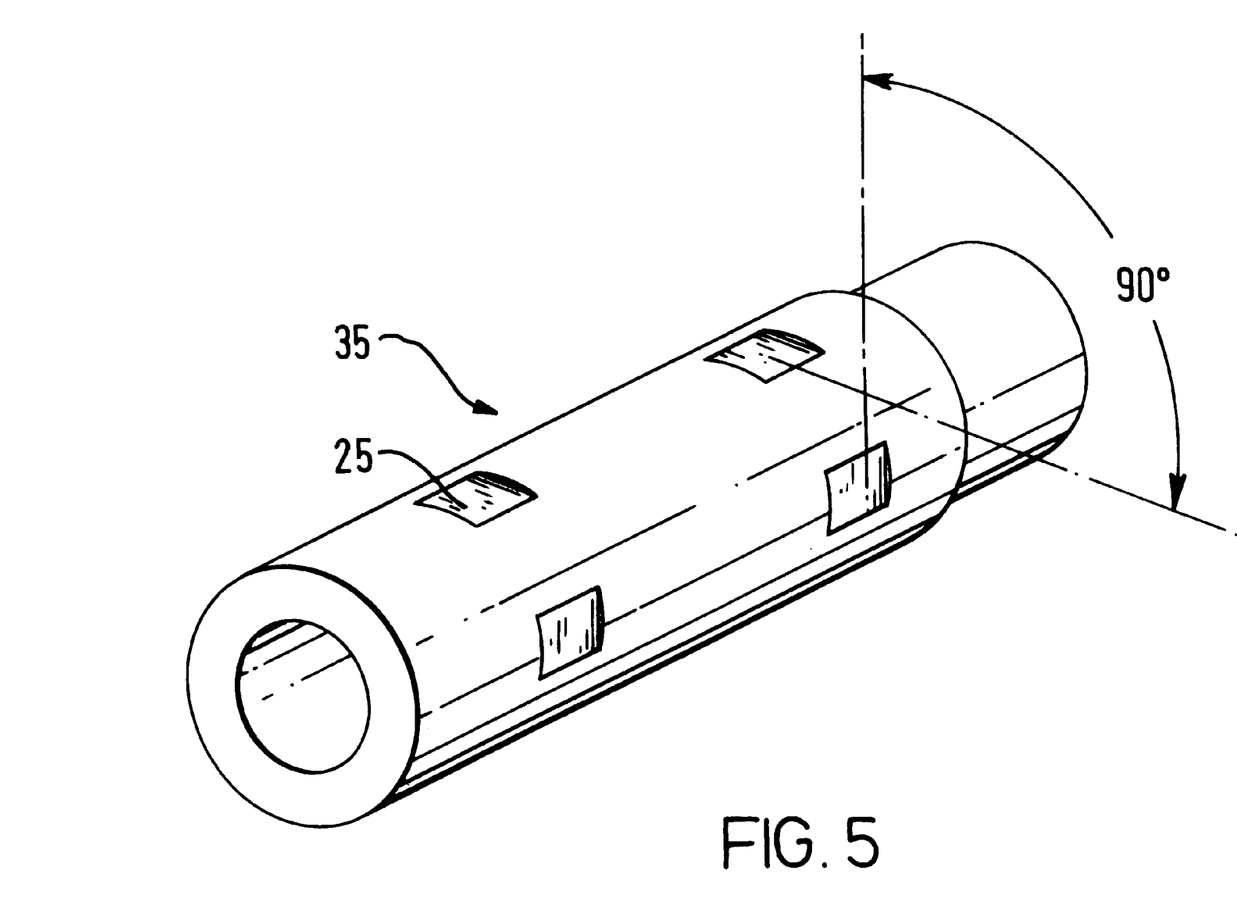
FIG. 5 shows an example of a carrier in accordance with the present invention in the form of a lens barrel.

As an alternative arrangement to the above, the optical fibre could be secured directly to the carrier, in which case the carrier and optical fibre assembly could be similar to the lens barrel shown in the present embodiment, but with suitable flat lands arranged on its outer surface. An example of such a construction is illustrated in FIG. 5. In this arrangement the assembly 35 would be inserted directly in the manipulator and then aligned as above described.

The above embodiment has been described with reference to the adjustment and alignment of a lens barrel. However, it is applicable to other situations and optical fibre assemblies. Once such application would be the use of two such manipulators back-to-back as an expanded beam connector for coupling two optical fibres. It can also be used in relation to optical components other than optical fibre assemblies, for example the adjustment of the position of lenses or diffraction gratings or other optical elements. It would also be applicable in situations for adjusting non-optical components where lateral and tilt adjustment relative to a longitudinal axis is desired.

What is claimed is:

1. An adjustable connector system for coupling an optical fibre assembly to an optical component, comprising:

a carrier having a body having a throughbore having a longitudinal axis and an outer surface, the carrier being adapted to receive the optical fibre assembly in use;

and a manipulator having a body having a throughbore having a longitudinal axis and adapted to receive the carrier and optical fibre assembly in use, the manipulator further including at least one adjustor which is engageable against the outer surface of the carrier when it is inserted in the manipulator throughbore and is adjustable by a user to then move the carrier relative to the manipulator in a direction perpendicular to the longitudinal axis of the manipulator throughbore, the at least one adjustor being arranged such that the tilt of the longitudinal axis of the carrier relative to the longitudinal axis of the manipulator throughbore can be adjusted;

the system further being arranged such that when the optical fibre assembly is inserted in the carrier movement of the at least one adjustor to effect movement of said carrier relative to the manipulator causes corresponding movement of the optical fibre assembly relative to the manipulator;

wherein the carrier includes one or more substantially planar lands on its outer surface arranged such that the carrier can be inserted into the manipulator in such a way that the adjustors in use will engage only the lands; and wherein the optical fibre assembly is releasably retained in the carrier when it is inserted therein, such that it can be repeatedly removed from and reinserted in the carrier, without the need to remove the carrier from the manipulator.

2. The system of claim 1, wherein the outer surface of the carrier away from the lands is curved.

3. The system of claim 1, wherein the lands are further arranged such that the carrier can only be inserted into the manipulator in such a way that the adjustors in use will engage only the lands in a single discrete orientation with respect to rotation about the longitudinal axis of the manipulator throughbore.

4. The system of claim 1, wherein the lands are arranged such that in use they lie in the plane perpendicular to the direction of motion of the respective adjustors, and also in a plane parallel to the longitudinal axis of the carrier throughbore.

5. The system of claim 1, wherein each adjustor engages a different separate land in use.

6. The system of claim 1, wherein there are two pairs of substantially mutually orthogonal lands on the carrier means outer surface, the lands of each pair being at the same longitudinal position along the length of the manipulator throughbore, and the two pairs being spaced apart from one another along the length of the manipulator throughbore; and wherein there are two pairs of substantially mutually orthogonal adjustors, the adjustors of each pair being at the same longitudinal position along the length of the manipulator throughbore, and the two pairs being spaced apart from one another along the length of the manipulator throughbore.

7. The system of claim 1, wherein there are two longitudinally spaced pairs of adjustors, the adjustors of each pair being together arranged to be able to displace the carrier in two directions perpendicular to the longitudinal axis of the manipulator, the displacement directions being arranged to be orthogonal to each other and to lie in a plane perpendicular to the longitudinal axis of the manipulator throughbore.

8. The system of claim 1, wherein the manipulator further includes a resilient biassing device for resiliently biassing the carrier against the adjustors when it is inserted in the manipulator.

9. The system of claim 8, wherein the biassing device is arranged such that the biassing force can be selectively removed and reapplied.

10. The system of claim 1, wherein the carrier further comprises a separable collar which mates in a fixed orientation with respect to rotation about the longitudinal axis of the carrier throughbore with the carrier body, which collar is securable to the optical fibre assembly.

11. The system of claim 1, further comprising an optical fibre assembly comprising a cylindrical tube holding a lens and optical fibre in a fixed relationship which is then received by the carrier.

12. The system of claim 1, wherein the manipulator comprises at least two adjustors; wherein the adjustors are spaced apart along the longitudinal axis of the throughbore, there being further positioned at the same longitudinal positions as each adjustor, a resilient biassing device for resiliently biassing the optical fibre assembly against the respective adjustor.

13. The system of claim 1, wherein the carrier comprises a hollow/cylindrical sleeve adapted to removably receive the optical fibre assembly in use, the sleeve having plural spaced apart substantially planar lands arranged on its outer surface; and the manipulator comprises a resilient biassing device for resiliently biassing the sleeve against the adjustors in use.

14. An adjustable connector system for coupling an optical fibre assembly to an optical component, comprising:

a carrier having a body having a throughbore having a longitudinal axis and an outer surface, the carrier being adapted to receive the optical fibre assembly in use;

and a manipulator having a body having a throughbore having a longitudinal axis and adapted to receive the carrier and optical fibre assembly in use, the manipulator further including at least one adjustor which is engageable against the outer surface of the carrier when it is inserted in the manipulator throughbore and is adjustable by a user to then move the carrier relative to the manipulator in a direction perpendicular to the longitudinal axis of the manipulator throughbore, the adjustor being arranged such that the tilt of the longitudinal axis of the carrier relative to the longitudinal axis of the manipulator throughbore can be adjusted in use;

the system further being arranged such that when the optical fibre assembly is inserted in the carrier movement of the at least one adjustor to effect movement of said carrier relative to the manipulator causes corresponding movement of the optical fibre assembly relative to the manipulator;

wherein the carrier includes one or more substantially planar lands on its outer surface arranged such that the carrier can be inserted into the manipulator in such a way that the adjustors in use will engage only the lands, the lands further being arranged such that the carrier can only be so inserted into the manipulator in one or more discrete orientations with respect to rotation about the longitudinal axis of the manipulator throughbore; and wherein the optical fibre assembly is releasably retained in the carrier when it is inserted therein, such that it can be repeatedly removed from and reinserted in the carrier, without the need to remove the carrier from the manipulator.

15. The system of claim 1, wherein the carrier further comprises one or more holes extending from the outer surface surrounding the carrier throughbore into the throughbore arranged in generally opposing relationship to the lands on the carrier.

* * * * *